United States Patent
Kohlen et al.

[11] Patent Number: 5,988,436
[45] Date of Patent: Nov. 23, 1999

[54] DISCHARGE DEVICE FOR BULK CONTAINERS FOR PARTICULATE BULK MATERIALS AND ITS USE

[75] Inventors: Rainer Kohlen, Wehrheim; Alexander Ruhs, Rheinfelden; Wolfgang Leonhardt, Frankfurt, all of Germany

[73] Assignee: Degussa Aktiengesellschaft, Frankfurt am Main, Germany

[21] Appl. No.: 09/065,592

[22] Filed: Apr. 24, 1998

[30] Foreign Application Priority Data

Apr. 26, 1997 [DE] Germany .......................... 197 17 732

[51] Int. Cl.⁶ .................................................. B65G 53/40
[52] U.S. Cl. ...................... 222/1; 222/636; 222/189.09; 406/65; 406/67
[58] Field of Search .................................. 222/630, 636, 222/637, 1, 368, 189.09; 406/62, 63, 64, 65, 67, 68

[56] References Cited

U.S. PATENT DOCUMENTS

| | | |
|---|---|---|
| 1,385,870 | 7/1921 | Gieseler . |
| 2,152,632 | 4/1939 | Cassiere . |
| 3,152,733 | 10/1964 | Ross ..................................... 222/368 X |
| 3,268,266 | 8/1966 | Brown . |
| 3,399,931 | 9/1968 | Vogt . |
| 3,455,490 | 7/1969 | Jolley .................................. 222/368 X |
| 3,574,411 | 4/1971 | Miller . |
| 4,410,106 | 10/1983 | Kierbow et al. ...................... 406/65 X |
| 4,560,307 | 12/1985 | Deitesfeld .............................. 406/67 X |

FOREIGN PATENT DOCUMENTS

| | | |
|---|---|---|
| 0 300 182 | 1/1989 | European Pat. Off. . |
| 0 488 162 | 6/1992 | European Pat. Off. . |
| 33 18 797 C2 | 1/1986 | Germany . |
| 37 11 084 | 10/1988 | Germany . |
| 4110036 A1 | 10/1992 | Germany . |

OTHER PUBLICATIONS

Patent Abstracts of Japan, vol. 007, No. 275 (M–261), Dec. 8, 1983, corresponding to JP Patent No. JP–58–152720 A issued Sep. 10, 1983.

*Primary Examiner*—Kevin P. Shaver

[57] ABSTRACT

Problems encountered when discharging bulk containers using a blow-through rotary valve can be avoided by the discharge device, according to the invention, in which a vent connection of the rotary valve is in connection with the internal chamber of the container through a filter hose open on both ends.

15 Claims, 2 Drawing Sheets

5,988,436

DISCHARGE DEVICE FOR BULK CONTAINERS FOR PARTICULATE BULK MATERIALS AND ITS USE

BACKGROUND OF THE INVENTION

The invention relates to a discharge device for bulk containers for particulate bulk materials, particularly powders and granules, preferably using a blow-through rotary valve, and its use, i.e. a process for discharging the bulk container.

Particulate bulk materials such as powders and granules are extensively transported in bulk containers from manufacturer to user and discharged at the user's premises. In the following description, bulk containers are intended to mean both bag-shaped containers, such as so-called bulk bags with a filling volume of a few hundred liters to several m$^3$, and silos and other container-shaped bags with or without a bag-shaped inlet with a filling volume of 5 to 50 m$^3$, particularly 10 to 30 m$^3$. The container-shaped large bags are conventionally fixed to the cargo bed of a road or rail vehicle in such a way that the contents can be discharged by opening the container's discharge opening located on one side and tilting the vehicle's cargo bed.

According to a known embodiment for discharging such bulk containers, particularly large bags with an inlet, a discharge device in connection with the bulk container is coupled to a blow-through rotary valve. In the simplest case, the discharge device can be the discharge provided by the container-inlet. By starting the motor for the cellular wheel of the blow-through rotary valve and supplying delivery gas, generally compressed air, to the blow-through part of the rotary valve, bulk material falling into the rotary valve is pneumatically fed to the destination, such as a stationary silo or reaction tank, via a delivery line. The main problem of a discharge device of this kind lies in the venting of the leakage air arising because of the excess pressure in the blow-through part of the rotary valve and of the compressed air conveyed with the cellular wheel to the product feeds Inadequate venting blocks the product feed and hence the discharge process because of air pockets which are formed.

To solve the inadequate venting, a vent connection arranged on the rotary valve has been connected hitherto to the internal chamber of the bulk container by a hose; if an inlet is present, the hose reaches into the inlet. Depending on the delivery pressure required and the particle size of the bulk material, however, considerable operational difficulties are encountered in the course of discharge: as the pressure increases, the container and/or the inlet are subject to excess pressure so that delivery air may be pressed out of the container and/or inlet and a great deal of dust created thereby on the outside.

SUMMARY OF THE INVENTION

The object of the invention is to provide an improved discharge device for bulk containers which no longer has the above-mentioned disadvantages.

A discharge device (5) for bulk containers for particulate bulk materials includes a pneumatic feeding facilitator in the form of a blow-through rotary valve (1), a coupling (10) to connect the blow-through rotary valve to a discharge chute (23) connected to the bulk container, a line (4) to supply delivery gas, and a delivery line (6) for fluidized bulk material out of the rotary valve. Above a cellular wheel the rotary valve has at least one vent line (27) which is in connection with the internal chamber of the bulk container by means of a filter hose (2) open on both ends.

Thus, according to the invention, the venting problem is solved in that one or more vent lines with filter hose(s), which are open at the top and bottom, are used instead of hitherto conventional hoses or pipes between the vent connection(s) of the rotary valve and the bulk container and/or its inlet. It is possible for a part of the vent line between the rotary valve and the bulk container to be in the form of a conventional hose provided that a sufficiently long piece of the vent line is formed as a filter hose or tube that is preferably exposed directly to the outside environment. By using a filter hose, a part of the delivery gas, mostly air, may float into the bulk container and/or its inlet and the excess delivery gas may escape to the outside in a dust-free manner via the filter hose. In this way, dust formation due to excess pressure of a bulk container and discharge problems caused by gas pockets are avoided.

DETAILED DESCRIPTION OF THE PREFERRED EMBODIMENTS OF THE INVENTION

Figure 1:
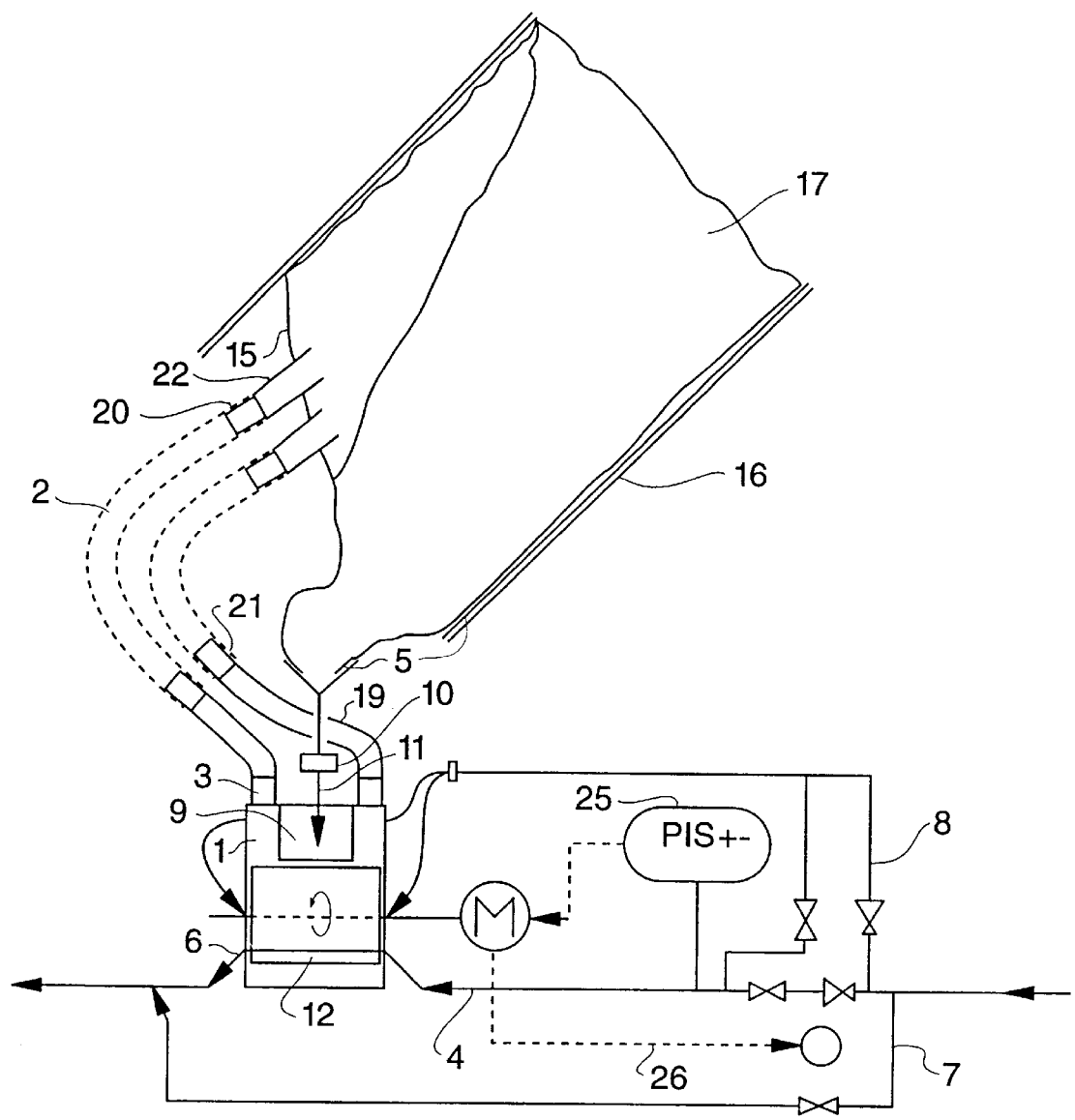
FIG. 1 shows a diagrammatic view of a discharge device.

The invention will be explained in greater detail with reference to the drawings. FIG. 1 shows a blow-through rotary valve (1), a cellular wheel ((13) in FIG. 2) of which is driven by a motor (M), a line (4) to supply delivery gas to a blow-through part (12) of the rotary valve, and an extraction line (6) for the fluidized material to be conveyed. The rotary valve, in the preferred embodiment, has two vents formed by vent connections (3), and a feed connection (11) for the material to be conveyed—shown in highly diagrammatic form in FIG. 1 but clearly identifiable in FIG. 2—and a shaft (9) through which the material to be conveyed is directly led into the cells of the cellular wheel. The separation of product feed and filter hose venting under the present invention prevents problems inside and outside the rotary valve, such as inadequate filling of the cells and excessively high discharge of material along vent line (27) which, if allowed, could create blockages in the hose pieces (2, 19, 22).

Figure 2:
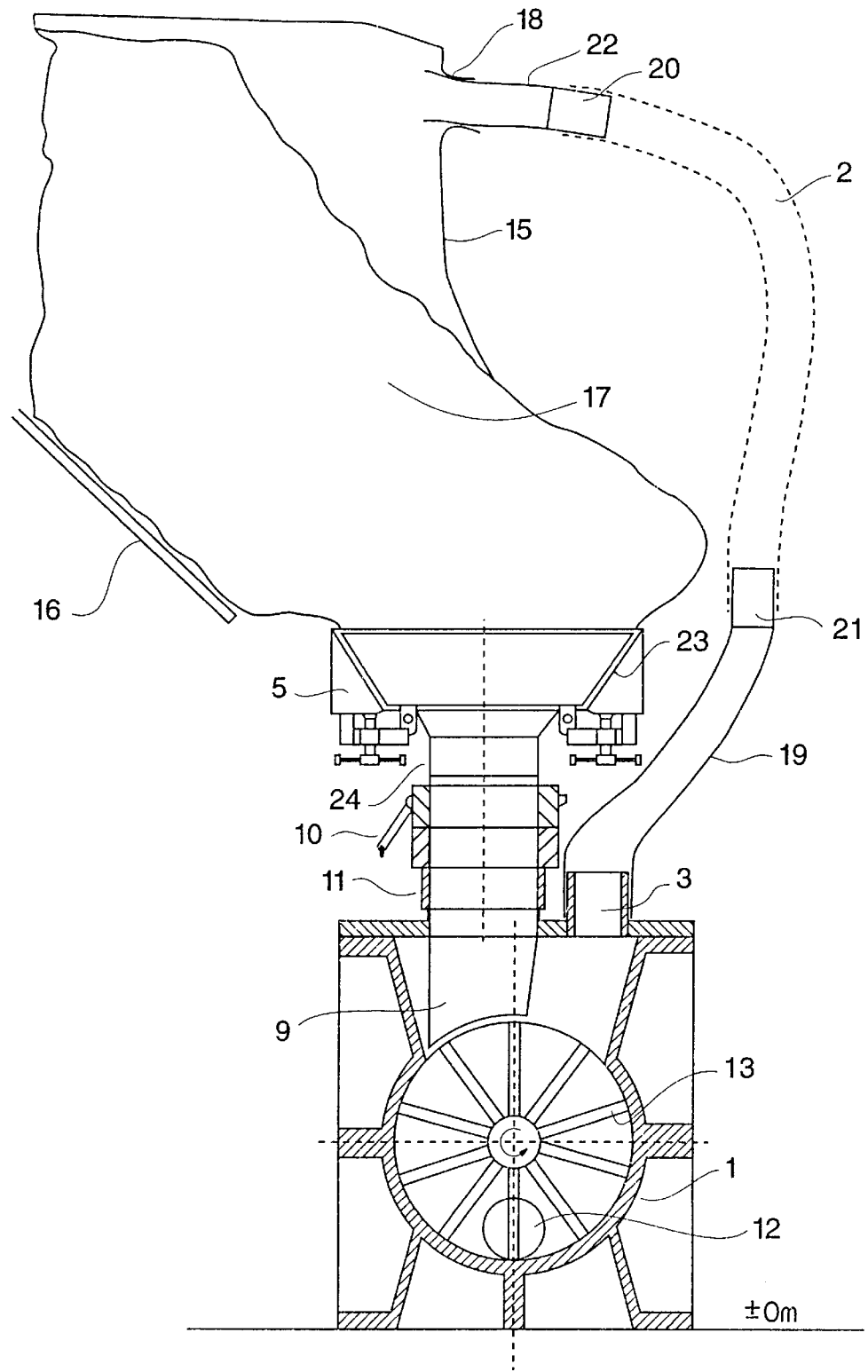
FIG. 2 shows a cross-section through a preferred discharge device.

One or more vent connections (3) each with adequately large nominal diameter are suitably arranged in the cover region of the rotary valve, preferably parallel to the vertically arranged feed connection (11). FIG. 1 also shows a bulk container (16) in the tilted position with inlet (15) and bulk material (17)—the vehicle with the tilting cargo bed on which the bulk container is fixed is not shown. The discharge opening of the inlet is connected to a discharge chute (23)—formed as a clamping device according to FIG. 2—the latter being connected to the feed connection (11) of the blow-through rotary valve (1) by a coupling (10). The clamping means to hold the discharge chute (23) to the bulk container (16) can be of a variety of mechanisms as known to one of ordinary skill in the art. As shown in FIG. 2, the clamping means are a pair of screws for tightening and holding the connection between the discharge chute (23) and the bulk container (16). In the illustrated embodiment, the tightening screws adjust a pivotable linkage assembly contacting both the discharge chute (23) and bulk container (16).

Extending between vent connections (3) and the bulk container (16) are one or more vent lines (27). The vent line connection to the bulk container can be, for example, a connection to a bag liner within a supporting shell such as a bag provided in a tanker or rail car (as shown) or directly to a linerless vessel functioning as the bulk container, or directly to a flexible bulk container without a supporting shell or some other particulate bulk material storage means. The illustrated vent lines (27) are attached at one end to the two vent connections (3), and include a lower hose piece (19), then a hose coupling (21) of the filter hose (2) open on both ends, whose upper end is in connection with the internal chamber of the bulk container via a further hose coupling (20) and an upper hose piece (22). According to FIG. 2 the upper hose piece is fixed in an opening (18) located in the inlet. FIG. 1 also shows a line (7) branched off from the delivery gas line (4) to back up the pneumatic delivery in the extraction line (6) and a branched line (8) to the seals of the blow-through rotary valve. FIG. 1 further shows appropriate closure and control valves, a conventional PIS controller (25), and control lines (26) for a stopper circuit with which the rotary valve is automatically switched off in the event of a blockage; this circuit also causes the secondary air through line (7) to be switched off if the motor (14) is stopped.

FIG. 2 shows a discharge device (5) having blow-through rotary valve (1) with cellular wheel (13), blow-through part (12), feed connection (11) vent connection (3), and also coupling (10). FIG. 2 also shows discharge device (5) formed as a clamping device as well as hose pieces (19) and (22) with the hose couplings (21) and (20) and the filter hose (2) representing a particularly advantageous feature of the invention. The discharge opening of the inlet (15) of the bulk container (16) is clamped into the discharge chute (23) while free flow can be initially prevented by an upstream tie or flow blocking device (not shown) in the discharge opening of inlet (15) such that the clamp connection can be made without dust release. Following clamping, the upstream tie or releasable closure is released such that the discharge of the bulk container is placed in a free flow state. The discharge chute (23) formed as a clamping device in a conical shape includes cylindrical connection (24) for connection to the coupling (10). An additional flow blocking valve can be placed in line between discharge device (5) and feed connection (11) if further control over introduction of material to the rotary valve (1) is desired.

Conventional commercial filter hoses, which have been used only in other settings, are used as the filter hose(s) in the present invention, and their pore width is selected so that dust is reliably retained at all times during operation, including the times when there is required to be released excess system pressure through the hose(s).

A device according to the invention is used to discharge the bulk container. The discharge chute (23) in connection with the bulk container is connected to a blow-through rotary valve (1) by the coupling (10). The vent connection (3) is connected to the filter hose (2) directly or through an intermediate hose piece and the open end of the filter hose or hose piece which adjoins it is returned into the bulk container. The material to be conveyed is pneumatically discharged from the container by operating the cellular wheel motor and blowing delivery air through the rotary valve while venting into the bulk container through vent line (27) which includes, filter hose (2), and any other hose or tube connectors attached thereto. Thus, any venting that may be required to prevent an excess delivery of vented gas to the bulk container is handled by the one or more filter hoses positioned within the one or more venting lines between the rotary valve and bulk container.

The present invention also features a process for discharging bulk containers for particulate bulk materials into a discharge device (5) using a blow-through rotary valve (1) connected through a coupling (10) to a discharge chute (23) in communication with the bulk container (16). The blow-through rotary valve (1) with one or more vent connections (3) is/are connected to a filter hose (2) directly or via other hose pieces (19, 20, 21, 22). The open end of the filter hose (2) is connected to the bulk container opening (18) directly or via a hose piece. The material to be conveyed is pneumatically discharged from the bulk container (16) by operating the cellular wheel motor (14) and blowing delivery air through the rotary valve (1). During the process, the filter hose (2) is designed to avoid inadequate venting blocks and the formation of air pockets in the feed line, while also helping to avoid excess buildup of pressure in the bulk container.

The discharge device is distinguished by uninterrupted operation and dustlessness when bulk containers are discharged. The discharge device is transportable and can be set up on an even surface. Discharging may be carried out in an excess pressure range, as is also conventional for the pneumatic delivery of bulk materials of low bulk density as well as bulk materials of high bulk density, in the range from 0.2 to 3 bars above atmospheric for example. Furthermore, the structural height of the discharge device is low enough that bulk containers on vehicles with a low-lying cargo bed can also be discharged without problems.

Further variations and modifications will be apparent to those skilled in the art from the foregoing and are intended to be encompassed by the claims appended hereto.

German priority application DE 197 17 732.8 is relied on and incorporated herein by reference.

What is claimed:

1. A method of unloading a bulk container using a discharge device comprising the steps of:

arranging a vent line which includes a filter hose so as to extend from the discharge device to the bulk container, connecting a discharge chute of the discharge device to the bulk container, pumping gas through the vent line with filter hose into the bulk container, receiving feed in the discharge means from the bulk container, and outputting the feed from the discharge device.

2. The method according to claim 1, further comprising the step of stopping operation of the discharge device when a clog or blocking occurs within the discharge device.

3. The method according to claim 1, further comprising venting excess gas pressure that builds up in the rotary valve through the filter hose, while blocking any particulate matter which may be entrained in the gas from passing through the filter hose.

4. A discharge device for bulk containers containing bulk materials; comprising:

a pneumatic feeding facilitator which includes a vent opening;

a coupling assembly with bulk material passageway, said coupling assembly having a connector for connecting the coupling assembly to the bulk container such that bulk material is feedable through the bulk material passageway, and said bulk material passageway opening into said pneumatic feeding facilitator;

a delivery gas line opening into said pneumatic feeding facilitator; and a vent line in communication with said vent opening and said bulk container and comprising a filter hose, whereby excess vent pressure can be relieved through said filter hose and external to said bulk container to avoid an overpressure situation therein.

5. A discharge device as recited in claim 4, wherein said coupling assembly includes a clamp assembly for clamping a discharge such that the discharge of the bulk material container opens into the bulk material passageway of the bulk material container to said coupling assembly, and a coupling mechanism for connecting said coupling assembly to said pneumatic feeding facilitator.

6. A discharge device for bulk containers for particulate bulk materials comprising:

a blow-through rotary valve having a cellular wheel, blow-through part, and vent, a discharge chute connected to the bulk container, whereby said discharge chute receives particulate bulk materials from the bulk container, a coupling connecting said blow-through rotary valve to said discharge chute, a delivery gas line connected to said blow-through part, an extraction line connected to said blow-through part, and a vent line which comprises a filter hose and extends between said vent and the bulk container.

7. The discharge device according to claim 6, wherein said discharge chute includes means for clamping said discharge chute to the bulk container.

8. The discharge device according to claim 6 further comprising:

a feed connection connected to said coupling, and a discharge shaft connected to said feed connection and opening into said cellular wheel.

9. The discharge device according to claim 8, wherein said discharge chute includes a clamping device that clamps the discharge chute to the bulk container.

10. The discharge device according to claim 8, wherein there are two vent lines extending between said rotary valve and bulk container, with at least one of said vent lines including said filter hose.

11. The discharge device according to claim 10, wherein said discharge chute includes means for clamping said discharge chute to the bulk container.

12. The discharge device according to claim 6, wherein there are two vent lines and two filter hoses with a first of said filter hoses in line with a first of said vent lines and a second of said filter hoses in line with a second of said vent lines, and said rotary valve includes at least two vent connections.

13. The discharge device according to claim 12, wherein said discharge chute includes means for clamping said discharge chute to the bulk container.

14. The discharge device according to claim 6 further comprising:

a controller connected to said delivery gas line, a motor connected to said controller and said cellular wheel, a control line connecting said controller with said blow-through rotary valve, a secondary air line connecting said delivery gas line to said extraction line, whereby said secondary air line is closed when said motor stops, and a branch line connected to said delivery gas line and said blow-through rotary valve.

15. The discharge device according to claim 6 wherein said vent line comprises:

an upper hose piece connected to the bulk container, a first hose coupling connected to said upper hose piece and said filter hose, a second hose coupling connected to said filter hose, and a lower hose piece connected to said second hose coupling and to the rotary valve vent.

* * * * *